United States Patent [19]

Rachel

[11] Patent Number: 5,752,292
[45] Date of Patent: May 19, 1998

[54] LAPTOP COMPUTER HINGE REINFORCING APPARATUS

[76] Inventor: John Jacob Rachel, 11715 Aden Road, Nokesville, Va. 20181

[21] Appl. No.: 747,584

[22] Filed: Nov. 13, 1996

[51] Int. Cl.[6] ................................................. E05D 7/10
[52] U.S. Cl. ........................ 16/254; 16/382; 16/372; 361/679; 361/681; 403/316
[58] Field of Search ........................ 16/254, 382, 387, 16/372, DIG. 40, DIG. 43, 250, 251, 252; 361/679–686, 789, 796, 803, 724–727; 403/294, 316

[56] References Cited

U.S. PATENT DOCUMENTS

| | | | |
|---|---|---|---|
| 1,835,042 | 12/1931 | Hammer | 16/382 |
| 2,371,729 | 3/1945 | Aspenleiter | 16/382 |
| 2,853,162 | 9/1958 | David et al. | 16/250 |
| 4,118,827 | 10/1978 | Yamamoto | 16/382 |
| 4,304,027 | 12/1981 | Di Fazio | 16/382 |
| 4,825,509 | 5/1989 | Mitchell et al. | 16/254 |
| 5,043,846 | 8/1991 | Kinoshita | 361/394 |
| 5,205,017 | 4/1993 | Wang | 16/367 |
| 5,379,182 | 1/1995 | Fujimori et al. | 361/681 |
| 5,379,183 | 1/1995 | Okonsky et al. | 361/681 |
| 5,507,072 | 4/1996 | Youn | 16/261 |

FOREIGN PATENT DOCUMENTS 1491438  8/1967  France .................................. 16/382

*Primary Examiner*—Chuck Mah
*Attorney, Agent, or Firm*—Roberts & Brownell, LLC.

[57] ABSTRACT

A laptop computer hinge reinforcement apparatus having a support plate and mounting block secured to a hinge. The support plate is fastened to a display panel cover and a support arm. The mounting block is fastened to the opposing side of the support arm. The mounting block has a plurality of threaded bores which are aligned with a plurality of receiving holes of the support arm. The supporting plate also has a plurality of holes and is substantially the same width as the support arm and hinged arm. The mounting block and supporting plate are secured to the support arm by fasteners that extend through the holes of the supporting plate through the receiving holes and into the threaded bores. The fastening means do not pass entirely through the bores of the mounting block. This configuration allows a second set of screws to engage the other end of the threaded bore so as to secure the support arm to the hinged arm. In this manner, the supporting plate and mounting block adds additional strength and rigidity to the hinge mechanism and display panel cover of the laptop computer.

20 Claims, 7 Drawing Sheets

LAPTOP COMPUTER HINGE REINFORCING APPARATUS

FIELD OF THE INVENTION

The present invention relates generally to a laptop computer hinge reinforcing mechanism. In particular, the present invention relates to a hinge support mechanism that reinforces the hinge located between the display screen and keyboard of a laptop computer to prevent damage to the computer screen.

BACKGROUND OF THE INVENTION

Laptop computers are commonly used by millions of people worldwide. Typically these laptop computers consist of a display screen hinged to a keyboard and processing unit ("keyboard"). In order to protect the laptop computer from damage due to overuse or abuse a tempered plastic case is used to encase the entire laptop computer including the screen display and keyboard.

In most instances, the hinged mechanism consists of a hinged arm integrally molded to the keyboard unit and a support arm integrally molded to the screen display. The hinged arm and support arm are typically formed from the same tempered plastic as the laptop case. Electronic circuitry usually spans this hinged mechanism in order to allow the keyboard to communicate with the display.

Integrally molded into the hinged arm and support arm are threaded projections. Due to manufacturing constraints, the threaded projections are formed from the same tempered plastic as the hinged mechanism and laptop computer case. In order to attach the hinged arm to the support arm screws or other fasteners are simply attached between the threaded projections of the hinged arm and support arm, respectively.

The laptop computer is usually stowed away in a closed position. That is, the screen display is folded down until it sits flush against the keyboard. At this time the screen display is locked into place by a locking mechanism located on the keyboard. After repeated use, however, (e.g. constant opening and closing of the display screen) the hinge mechanism has a tendency to fatigue and ultimately fail. In most instances the threaded projections crack, and in some instances, actually "shear off" from the plastic case. This failure is due to repetitive loads (e.g. opening and closing) and other stresses which were not taken into account during the design and manufacturing processes of the laptop computer. The failure of the hinge mechanism also causes the electronic circuitry spanning the hinged mechanism to "short" causing major damage to the laptop computer.

To overcome the shortcomings of the present hinge mechanisms a reinforcing hinge that can withstand repetitive forces associated with the constant opening and closing of the display screen is needed. This hinge reinforcement would utilize materials that would enhance the durability of the laptop computer and could be retrofitted to existing laptop computers.

SUMMARY OF THE INVENTION

It is therefore an object of the present invention to provide a laptop computer hinge reinforcement mechanism that reinforces an already existing laptop computer hinge.

It is a further object of the present invention to provide a laptop computer hinge reinforcement mechanism that withstands the repetitive stresses associated with the opening and closing of a laptop computer display screen.

It is an additional object of the present invention to provide a laptop computer hinge reinforcement mechanism that enhances the durability of an existing laptop computer hinge.

It is still a further object of the present invention to provide a laptop computer hinge reinforcement mechanism that is easy to install on an existing laptop computer hinge.

It is also an object of the present invention to provide a laptop computer hinge reinforcement mechanism that utilizes to the maximum practicable extent the components already manufactured with the laptop computer.

These and other objects and advantages of the present invention will be apparent to those of ordinary skill in the art upon inspection of the detailed description, drawings, and appended claims.

The present invention is a laptop computer hinge reinforcement mechanism comprising a support plate mounted to a laptop computer cover and a mounting block secured to a laptop computer hinge. The laptop computer hinge comprises a support arm depending downward from a display panel cover and a hinged arm connected to a laptop computer body. The width of the hinged arm and support arm vary depending on the laptop computer. Integrally molded into the display panel cover are a plurality of projections and housings. The support arm also comprises a plurality of receiving holes.

The mounting block has a plurality of threaded bores which are aligned with the plurality of receiving holes of the support arm. The supporting plate also has a plurality of holes and is substantially the same width as the support arm and hinged arm.

The mounting block and supporting plate are secured to the support arm by fasteners, such as screws, that extend through the holes of the supporting plate through the receiving holes and engage the threaded bores. Additionally, fastening means are also extended through holes of the supporting plate to the display panel cover. In this manner, the supporting plate adds additional reinforcement to the hinge mechanism of the laptop computer.

As previously disclosed the fastening means extend through the supporting plate through the receiving holes and into the threaded bores. The fastening means does not pass entirely through the bores of the mounting block. This configuration allows a second set of screws to engage the other end of the threaded bore so as to secure the support arm to the hinged arm. In the preferred embodiment the support arm is sandwiched between the supporting plate and mounting block.

DETAILED DESCRIPTION OF THE PRESENT INVENTION

Figure 1:
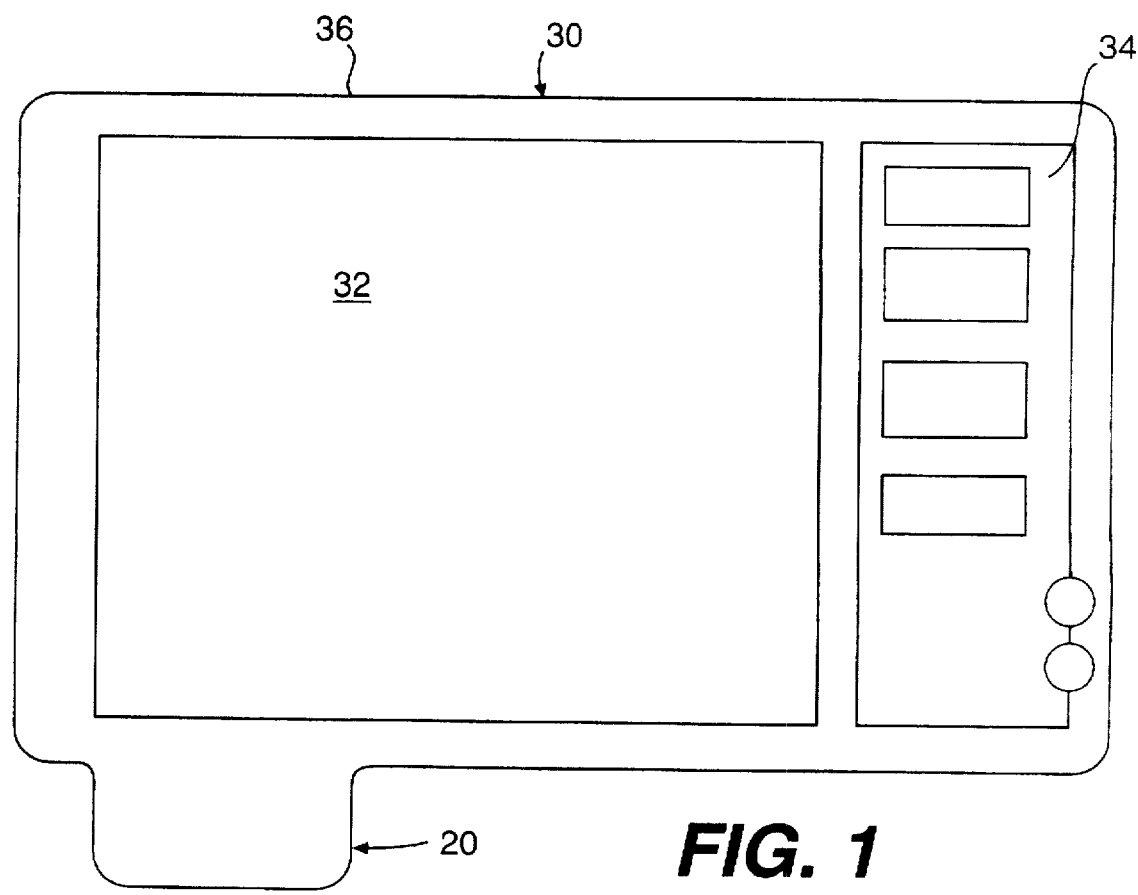
FIG. 1 shows the display panel and display panel cover of the laptop computer.

FIG. 1 shows a laptop computer having a display panel cover 30 and a display screen 32. Positioned within the display panel cover 30 is a display screen 32 and a control panel 34. Integrally molded about the perimeter of the display panel cover 30 is a lip 36. Integrally molded and depending downward from a lower edge of the display panel cover 30 is a support arm 20. The width of the support arm 20 varies depending on the laptop computer.

Figure 2:
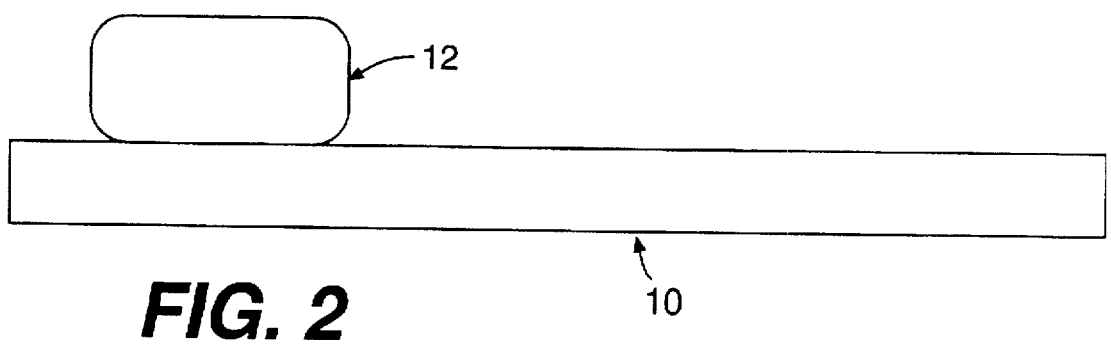
FIG. 2 shows the laptop computer body and hinged arm.

Referring to FIG. 2 a computer body is shown. The computer body 10 comprises a hinged arm 12 and a keyboard (not shown). The width of the hinged arm 12 also varies depending on the laptop computer. Thus, the support arm 20 and hinged arm 12 can span the entire length of the display panel cover 30 and computer body 10, respectively, depending on the dimensions of the laptop computer. Alternatively, several support arms 20 and hinged arms 12 can be placed along the computer body 10 for added support.

Figure 3:
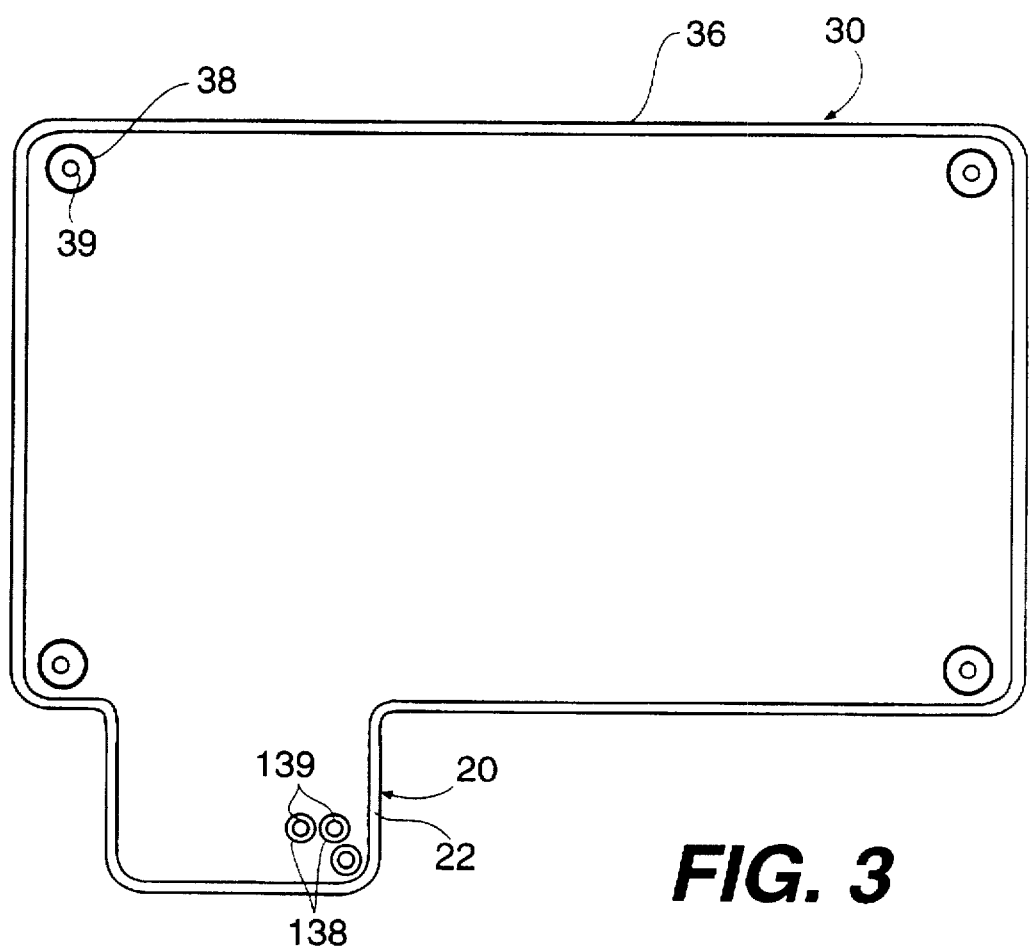
FIG. 3 shows the front of the display panel cover.

FIG. 3 shows the front of the display panel cover 30 and downward depending support arm 20. In this case the display screen 36 and the control panel 34 are removed from the display panel cover 30. Integrally molded into the display panel cover 30 are a plurality of projections 38. Engaged within the projections 38 are threaded housings 39. The display screen 36 and control panel 34 are secured to the display panel cover 30 by screws or other fasteners secured to the threaded housings 39. The support arm 20 also comprises a lip 22 and threaded housings 139 and projections 138.

FIGS. 1, 2 and 3 show the laptop computer prior to the installation of the present invention. That is, FIGS. 1, 2 and 3 represent a laptop computer as it was originally designed and manufactured.

Figure 4:
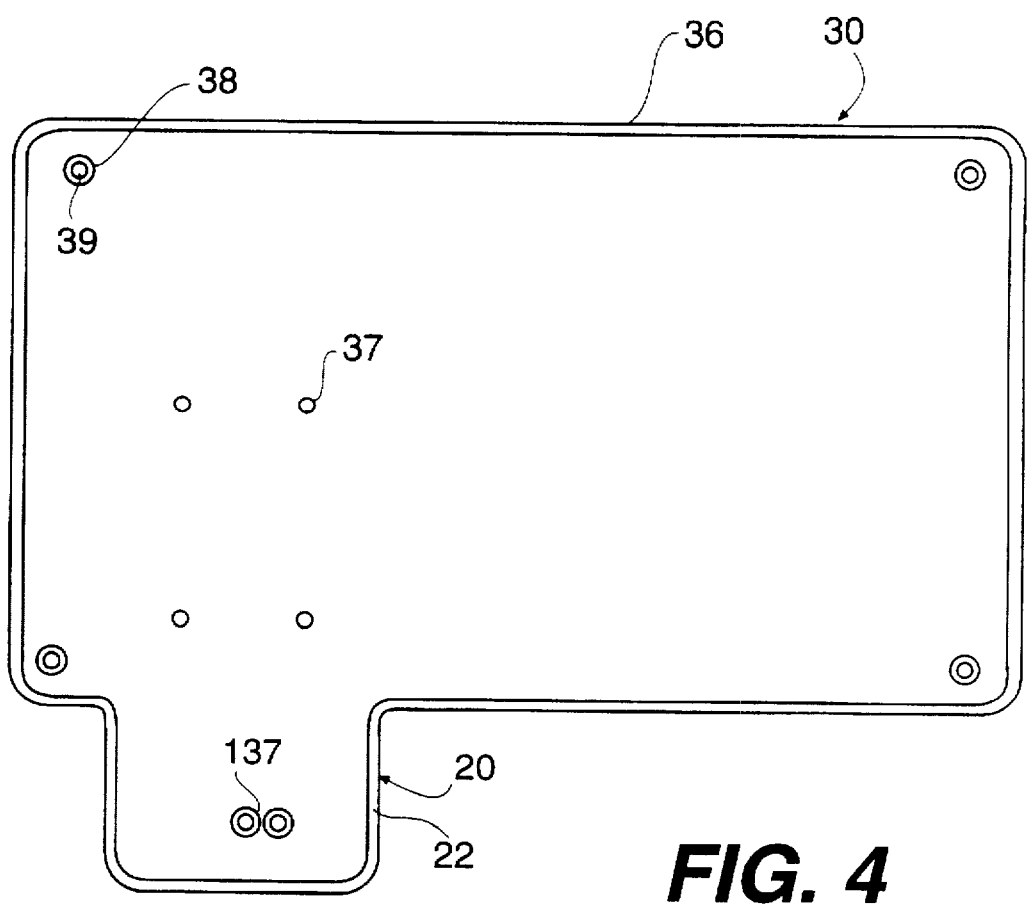
FIG. 4 shows the front of the display panel cover with receiving holes.

FIG. 4 shows the front of the display panel cover 30 having a plurality of receiving holes 37. The support arm 20 also comprises a plurality of receiving holes 137. The support arm 20 receiving holes 137 replace the projections 138 and housings 139. In this case, the projections 138 and housings 139 are removed (e.g. filed down) to create a smooth surface. Thereafter the receiving holes 137 are bored into the surface of the support arm 20.

Figure 6:
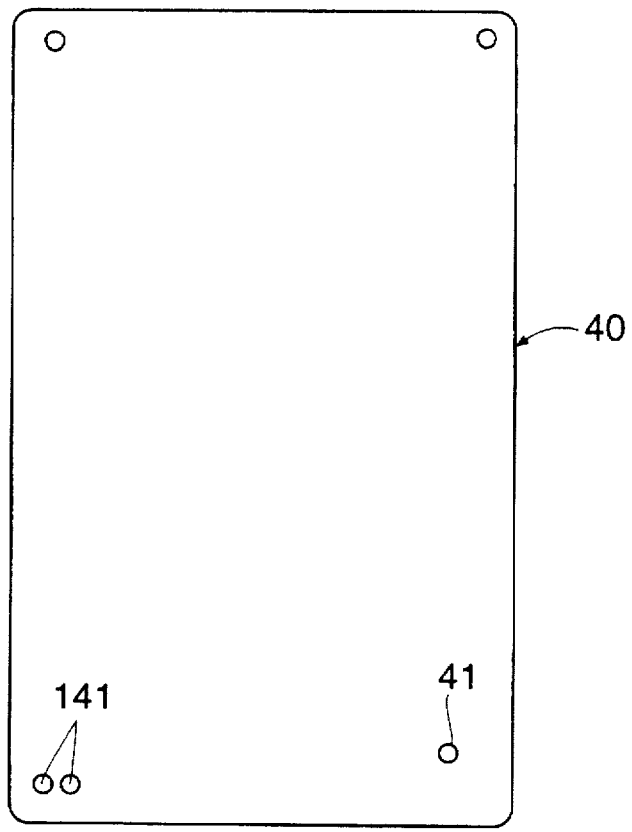
FIG. 6 shows the supporting plate.
Figure 5:
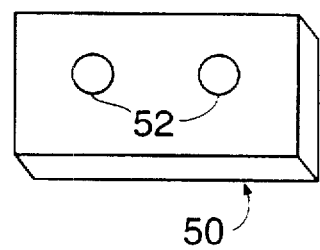
FIG. 5 shows the mounting block.

FIG. 5 shows a mounting block 50. The mounting block has a plurality of threaded bores 52. When the mounting block 50 is mounted to the laptop computer the bores 52 are in alignment with the plurality of support arm 20 receiving holes 137. FIG. 6 shows a supporting plate 40 having a plurality of holes 41 and 141. When the supporting plate 40 is mounted to the laptop computer, holes 141 align with bores 50 and receiving holes 137 and holes 41 align with holes 37.

The supporting plate 40 is substantially the same width as the support arm 20 and hinged arm 12 in order to add lateral support to the hinged mechanism. Additionally, due to the size of the supporting plate 40, the loads and stresses associated with the hinges are distributed over a larger surface area thereby reducing those loads and stresses by redistributed them away from the hinged mechanism. Thus, the hinged mechanism is less likely to fatigue due to repetitive and abusive use. Moreover, the supporting plate 40 adds further rigidity to the display panel cover 30 thus reducing the fatigue associated with the repetitive and, possibly, abusive forces associated the normal use of the laptop computer.

In the preferred embodiment the supporting plate 40 and mounting block 50 comprise machined aluminum although other materials may also be used by the present invention.

The mounting block 50 and supporting plate 40 are secured to the support arm 20 by fasteners, such as screws. The fasteners extend through the supporting plate holes 141 and the receiving holes 137 and finally engage the threaded bores 52. Additionally, fastening means also extended through holes 41 of the supporting plate 40 to the display panel cover 30. In this manner, supporting plate 40 also adds additional strength to the hinged mechanism of the laptop computer. It is preferred that the fasteners (e.g. screws) only pass partially through the bores 52 of the mounting block 50.

Figure 7:
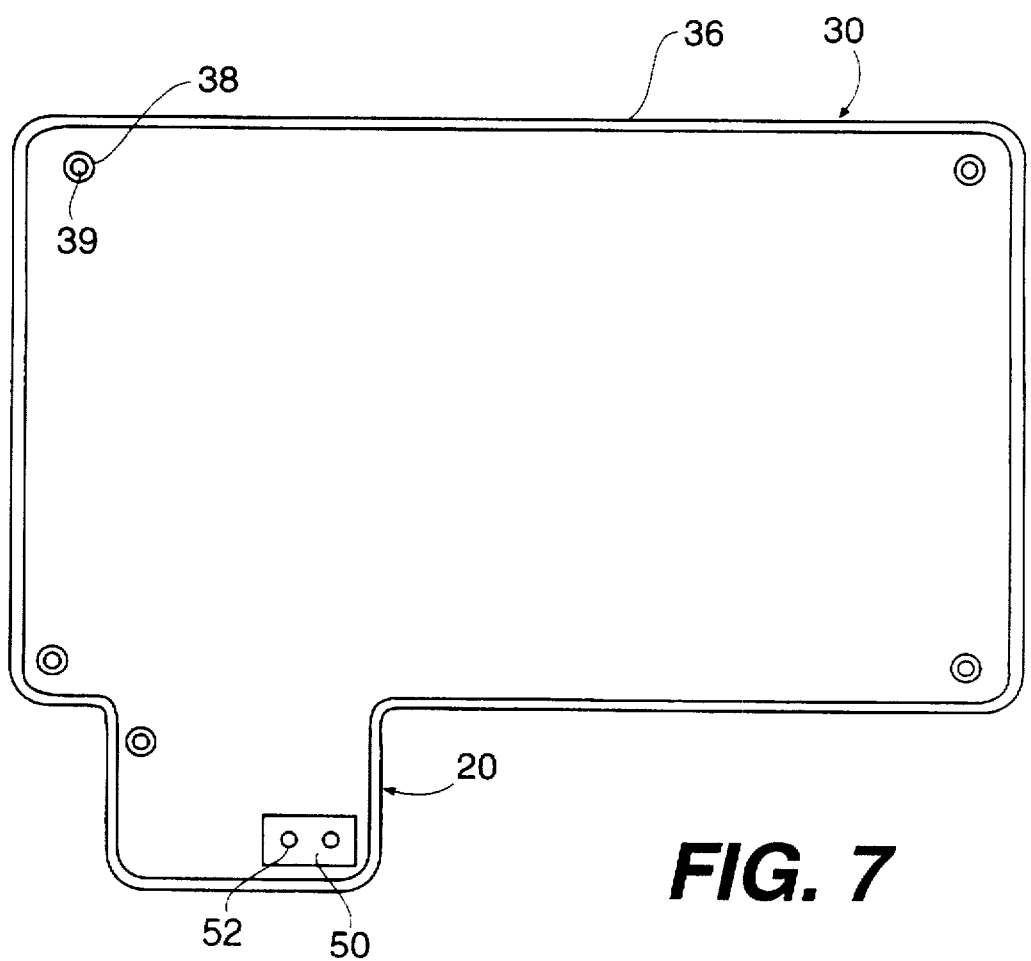
FIG. 7 shows the front of the display panel cover with the mounting block attached.

FIG. 7 shows the front of the display panel cover 30 and support arm 20. As seen, the mounting block 50 is secured to the support arm 20 by fastening means such as screws. As previously disclosed the fastening means extend through the supporting plate 40 and the receiving holes 37 and finally engage the threaded bores 52. The fastening means do not pass entirely through the bores 52 of the mounting block 50. This configuration allows a second set of fastening means (e.g. screws) to engage the other end of the threaded bore 52 thereby securing the support arm 20 to the hinged arm 12. In the preferred embodiment the support arm 20 is sandwiched between the mounting block 50 and supporting plate 40.

Figure 8:
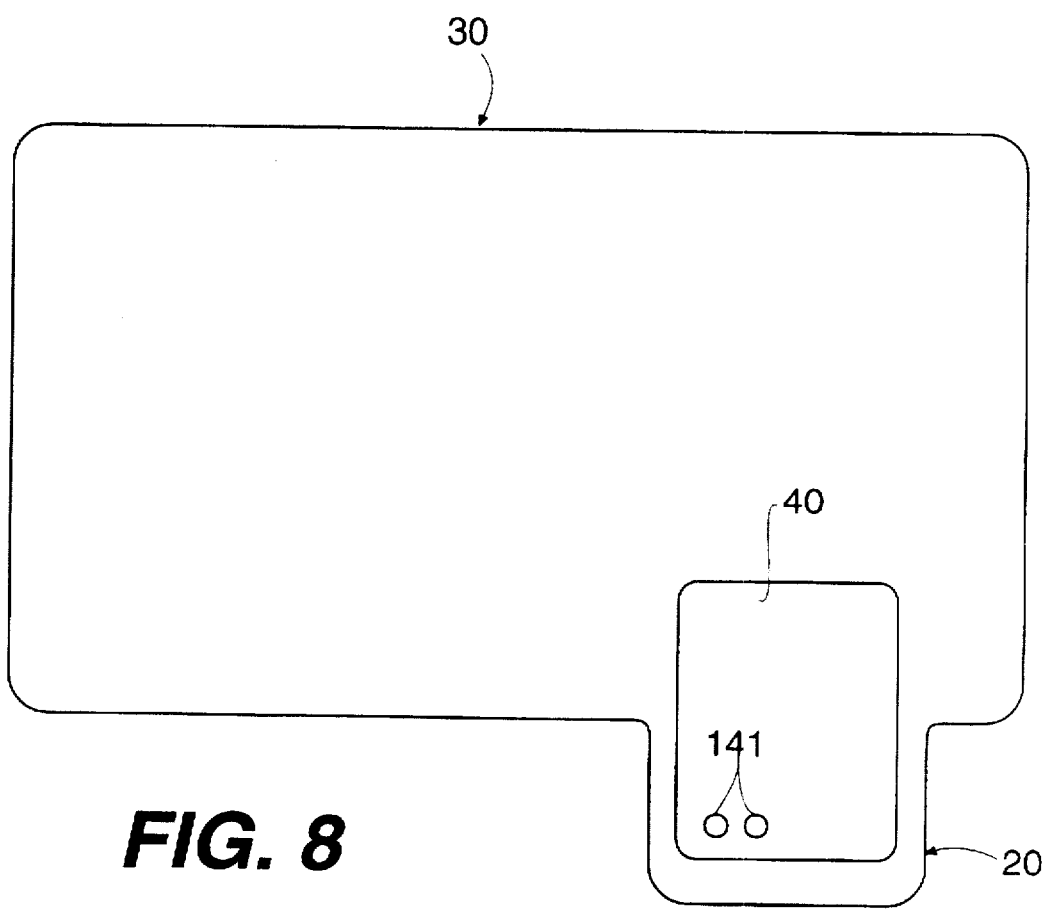
FIG. 8 shows the rear of the display panel cover with the supporting plate attached.

FIG. 8 shows the rear of the display panel cover 30 with the supporting plate 40 secured to the rear of the display panel cover 30. The holes 141 are aligned with the bores 52 of the mounting block 50 and the receiving holes 137. Additionally, the holes 40 are aligned with the receiving holes 37.

Figure 9:
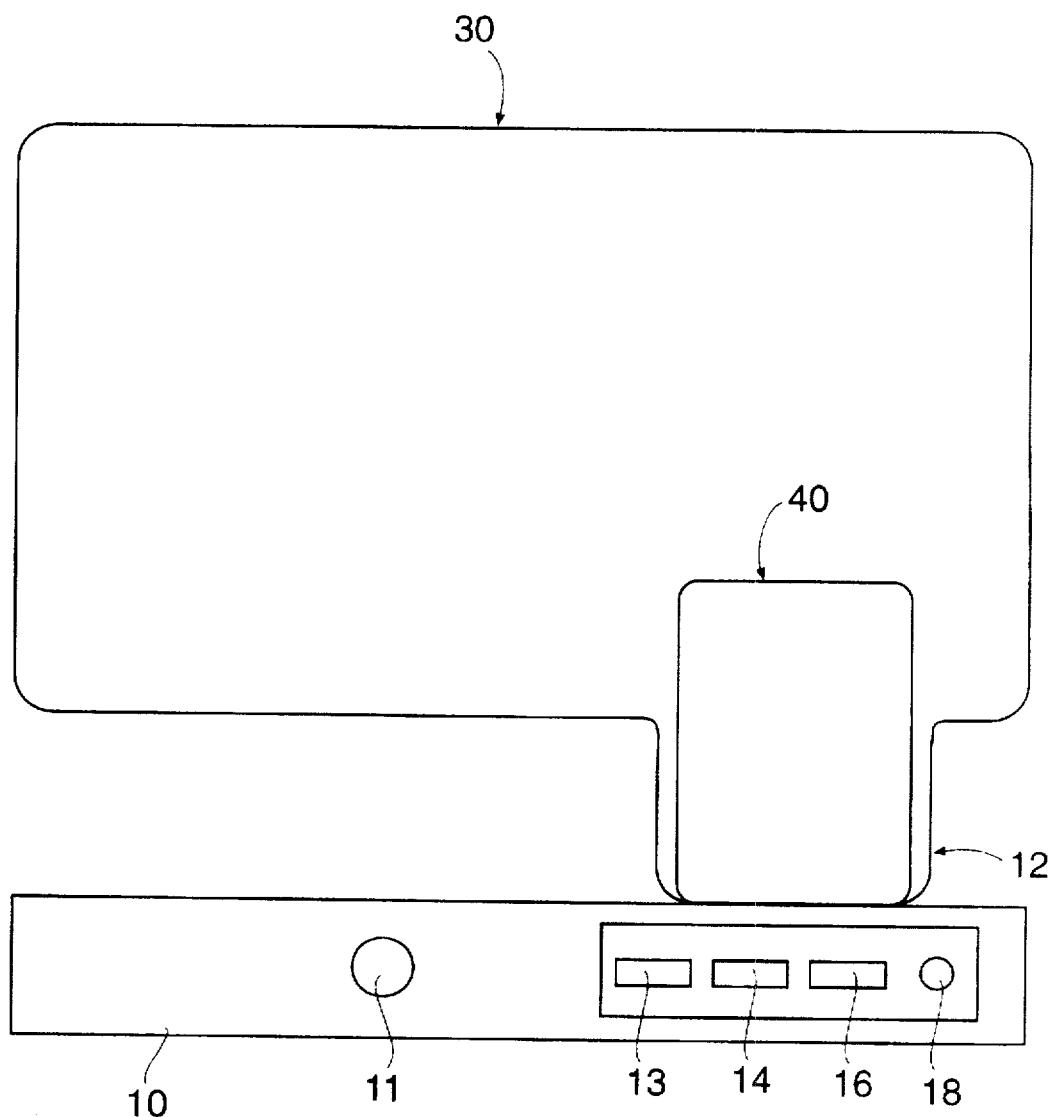
FIG. 9 shows the assembled laptop computer with the supporting plate in place.

FIG. 9 shows the assembled laptop computer with the supporting plate 40 secured to the hinged arm 12, support arm 20, and display panel cover 30. In this case, the computer body 10 comprises (i) an AC port 11, (ii) two accessory ports 12 and 13, (iii) a video port 16, and (iv) a mouse port 18. Other ports and accessories are also contemplated.

By assembling the present invention as explained above, the hinge of the laptop computer is now reinforced. In this manner, the laptop computer can now withstand such forces as repetitive stresses (e.g. opening and closing), weight bearing loads, lateral loads, and other unforseen stresses that were not taken into account when originally designed and manufactured.

It is noted that this hinge support mechanism is also contemplated for use with other hinge mechanisms. For example, this hinge support is adaptable for use with doors, cabinets, and other hinged items.

The detailed description of the present invention is based on a laptop computer hinge reinforcement mechanism. All numbers and dimensions that are used in this description are based on a laptop computer hinge support that reinforces a hinged arm on a laptop computer or other hinged mechanism. The dimensions of the laptop computer hinge reinforcement mechanism, including supporting plates, mounting blocks, and other dimensions and quantities specified herein may vary with the size and type of hinge contemplated for use with the present invention. Therefore, numbers and dimensions specified herein are not to be construed as limitations on the scope of the present invention but are meant to be merely illustrative of one particular application.

Preferred and alternative embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons of ordinary skill in the art.

What is claimed is:

1. A laptop computer hinge reinforcing mechanism wherein the laptop computer comprises a computer body having a hinged arm, the hinged arm having a plurality of holes, wherein the reinforcing mechanism comprises:

(a) a display panel cover, the display panel cover comprising at least one downward depending support arm integrally molded into its lower edge, the depending support arm having an interior and exterior surface and a plurality of receiving holes, the depending support arm and the hinged arm cooperate with one another;

(b) a mounting block having a plurality of threaded bores mounted on the interior surface of the support arm and the threaded bores are aligned with the plurality of support arm receiving holes and hinged arm holes;

(c) a supporting plate mounted on the exterior surface of the support arm and display panel cover, the supporting plate further comprises a plurality of holes, the supporting plate holes are aligned with the mounting block threaded bores and the support arm receiving holes; and (d) fastening means secured through the supporting plate holes, support arm receiving holes, and hinged arm holes and engaged in the mounting block threaded bores.

2. The laptop computer hinge reinforcing mechanism of claim 1, wherein the support arm and hinged arm are substantially the width of the computer body.

3. The laptop computer hinge reinforcing mechanism of claim 1, wherein the supporting plate is substantially the same width as the support arm and hinged arm.

4. The laptop computer hinge reinforcing mechanism of claim 1, wherein the fastening means are screws.

5. The laptop computer hinge reinforcing mechanism of claim 4, wherein the screws extend partially through the threaded bores.

6. The laptop computer hinge reinforcing mechanism of claim 1, wherein the support arm is sandwiched between the supporting plate and the mounting block.

7. The laptop computer hinge reinforcing mechanism of claim 1, wherein the display panel cover comprising a plurality of holes, the display panel cover holes are aligned with the supporting plate holes.

8. The laptop computer hinge reinforcing mechanism of claim 7, wherein bolts are placed within the display panel cover holes.

9. The laptop computer hinge reinforcing mechanism of claim 8, wherein fastening means are placed through the supporting plate holes and engage the bolts.

10. The laptop computer hinge reinforcing mechanism of claim 1, wherein the supporting plate distributes various loads and stresses associated with the hinged arm and support arm over a large surface area thereby reducing the loads and stresses by redistributed them away form the hinged arm and support arm.

11. The laptop computer hinge reinforcing mechanism of claim 1, wherein the supporting plate and mounting block comprise machined aluminum.

12. A laptop computer hinge reinforcing mechanism comprising:

(a) a laptop computer having a display panel cover, the display panel cover comprises at least one downward depending support arm integrally molded into its lower edge, the support arm having an interior and exterior surface and a plurality of receiving holes;

(b) a computer body, the computer body having a hinged arm, the hinged arm having a plurality of holes;

(c) a mounting block having a plurality of threaded bores, the mounting block is mounted on the interior surface of the support arm, the threaded bores are aligned with the plurality of support arm receiving holes and hinge arm holes;

(d) a supporting plate mounted on the exterior surface of the support arm and display panel cover so that the support arm is sandwiched between the supporting plate and mounting block, the supporting plate further comprises a plurality of holes, the supporting plate holes are aligned with the mounting block threaded bores and the support arm receiving holes; and (e) fastening means, the fastening means are secured through the supporting plate holes, support arm receiving holes, and hinged arm holes and engage the mounting block threaded bores.

13. The laptop computer hinge reinforcing mechanism of claim 12, wherein the support arm and hinged arm hinged are substantially the width of the computer body and the supporting plate is substantially the same width as the support arm and hinged arm.

14. The laptop computer hinge reinforcing mechanism of claim 12, wherein the fastening means are screws.

15. The laptop computer hinge reinforcing mechanism of claim 14, wherein the screws extend partially through the threaded bores.

16. The laptop computer hinge reinforcing mechanism of claim 12, wherein the display panel cover comprises a plurality of holes, the display panel cover holes are aligned with the supporting plate holes.

17. The laptop computer hinge reinforcing mechanism of claim 16, wherein bolts are placed within the display panel cover holes and the fastening means are placed through the supporting plate holes and engage the bolts.

18. The laptop computer hinge reinforcing mechanism of claim 12, wherein the supporting plate and mounting block comprise machined aluminum.

19. A laptop computer hinge reinforcing mechanism comprising:

(a) a hinged element having a plurality of hinged surface holes, a hinged surface interior and a hinged surface exteriorl;

(b) a flat surface having a hinge, a plurality of flat surface holes, a flat surface interior and a flat surface exterior, the flat surface holes are aligned with the hinged surface holes, and the hinged surface interior is mounted to the flat surface interior;

(c) a mounting block having a plurality of threaded bores, the mounting block is mounted on the hinged surface exterior and the threaded bores are aligned with the plurality of hinged surface holes and flat surface holes;

(d) a supporting plate, the supporting plate is mounted on the flat surface exterior, the supporting plate further comprises a plurality of supporting plate holes, the supporting plate holes are aligned with the mounting block threaded bores and the plurality of hinged surface holes and flat surface holes; and (e) a fastening means, the fastening means are secured through the supporting plate holes, plurality of hinged surface holes and flat surface holes and engage the mounting block threaded bores.

20. The hinge reinforcing mechanism of claim 19, wherein the fastening means extend substantially through the threaded bores.

* * * * *